Sept. 7, 1954   C. M. TUTTLE   2,688,278
RAPID PRESENTATION OF PHOTOGRAPHIC IMAGES
Filed Dec. 23, 1950   2 Sheets-Sheet 1
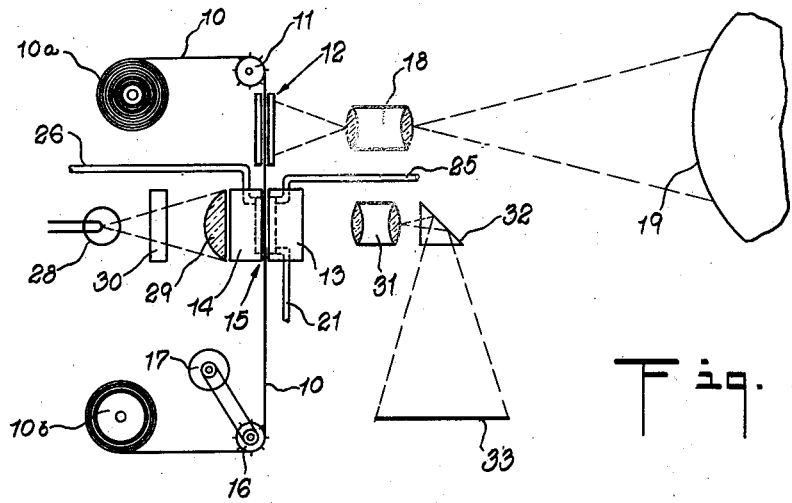
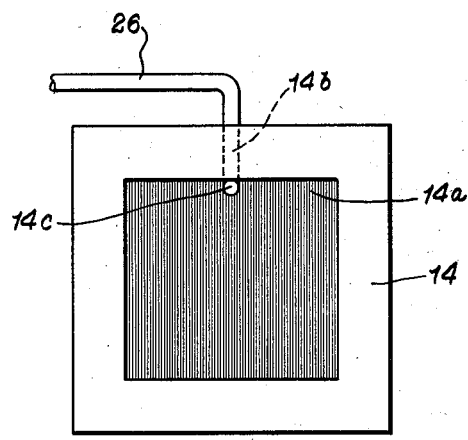
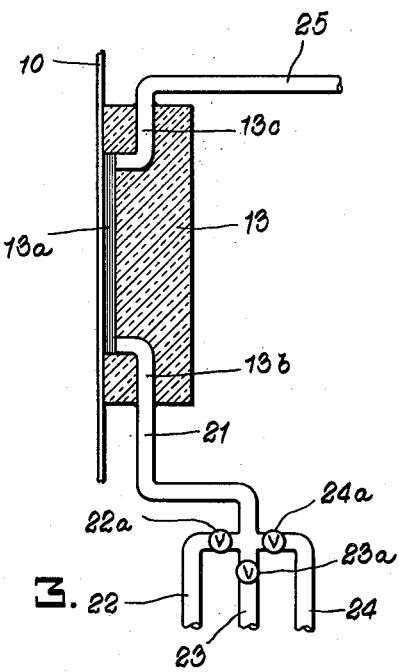
INVENTOR.
CLIFTON M. TUTTLE
BY
Davis, Hoxie Faithfull
HIS ATTORNEYS Sept. 7, 1954     C. M. TUTTLE     2,688,278
RAPID PRESENTATION OF PHOTOGRAPHIC IMAGES
Filed Dec. 23, 1950     2 Sheets-Sheet 2

INVENTOR.
CLIFTON M. TUTTLE
BY
HIS ATTORNEYS

Patented Sept. 7, 1954

2,688,278

UNITED STATES PATENT OFFICE 2,688,278

RAPID PRESENTATION OF PHOTOGRAPHIC IMAGES

Clifton M. Tuttle, Cold Spring Harbor, N. Y., assignor to Kenyon Instrument Company, Inc., Huntington, N. Y.

Application December 23, 1950, Serial No. 202,505

5 Claims. (Cl. 95—14)

This invention relates to the production of photographic images and more particularly to an improved process and system by which such images may be presented rapidly for visual inspection.

There are many occasions in photographic work in which extremely fast viewing of the picture is desired, that is, in which it is desired to reduce to a minimum the time interval between exposure of the photographic film and the viewing of the photographic image. For example, in radar photography, it is necessary to minimize this time interval as much as possible. In a copending application of Clifton M. Tuttle and Fordyce M. Brown, Serial No. 114,701, filed September 9, 1949, now Patent No. 2,665,619, issued January 12, 1954, there is disclosed an apparatus for taking a radar picture on a band of film, moving the film from the exposure station to a second station where it is processed by developer and fixer solutions, and then moving it to a third station where the newly processed image is projected. In such an apparatus the film must remain stationary at the processing station while a following section of the film is being exposed at the preceding exposure station. In a typical case in radar photography, the exposure interval, which is determined by the rate of the radar antenna rotation, occupies six seconds. Thus, each film section exposed to the radar screen is moved from the exposure station to the processing station and remains there for the following six seconds while the next section of the film is being exposed. It will be apparent that with an apparatus of this character there is no value in accelerating the film processing cycle to any period less than six seconds, in the example given above, because the film cannot be moved from the processing station until the next latent image has been formed at the exposure station on the following section or frame of the film. As a result of this time cycle, there is a delay amounting to six seconds between the time when a latent image is formed on the film and the time when it can be used. In modern aircraft observation by the use of radar, the six second delay can result in an error of approximately a mile in the position observation.

The present invention has for its principal object the provision of a process and system whereby the abovementioned delay is eliminated or at least reduced to a negligible amount.

According to the invention, the photographic film is first exposed to light from the object to be photographed, such as a radar screen. Then, a developer solution is promptly applied to the emulsion side of the exposed film to develop the latent image of the object. Simultaneously with the application of the solution and during the development of the image on the film, non-actinic light is passed through the film to form a projection of the image as it develops on the film. This projected image will consequently appear with increasing clarity on the projection screen as the development operation proceeds. The latent image will begin to appear as a silver image on the projection screen immediately upon application of the developer solution to the film, and within approximately the first half second, the development is completed so that the image obtains clarity on the screen.

The new system comprises an exposure station for receiving the photographic film, there being a lens positioned to project an image of the object on the emulsion side of the film at this station. Beyond the exposure station, reckoned in the direction of the film movement, is a transparent member forming a film processing station. This member has a shallow recess adapted to be covered by the emulsion side of the film at the processing station. Associated with this recessed member are means for feeding a developer solution through the recess, whereby the solution flows rapidly in a thin stream over the emulsion side of the film to develop the latent image thereon. Optical elements including the transparent member at the processing station are arranged to project light from a lamp or other suitable source through the film at the processing station and upon a projection screen. Preferably, an actinic light filter is interposed between the light soure and the projection station, so that the light passing through the film at the processing station is rendered non-actinic. The film is moved from the exposure station to the processing station by a suitable film actuator, which preferably includes means for advancing the film in strip form, step by step.

For a better understanding of the invention, reference may be had to the accompanying drawings, in which Fig. 1 is a schematic view of a preferred form of the new system;

Fig. 2 is an enlarged elevational view of one of the transparent members forming the processing station, showing the face of the member opposite the film;

Fig. 3 is a sectional view of the other transparent member forming the processing station.

Figure 4:
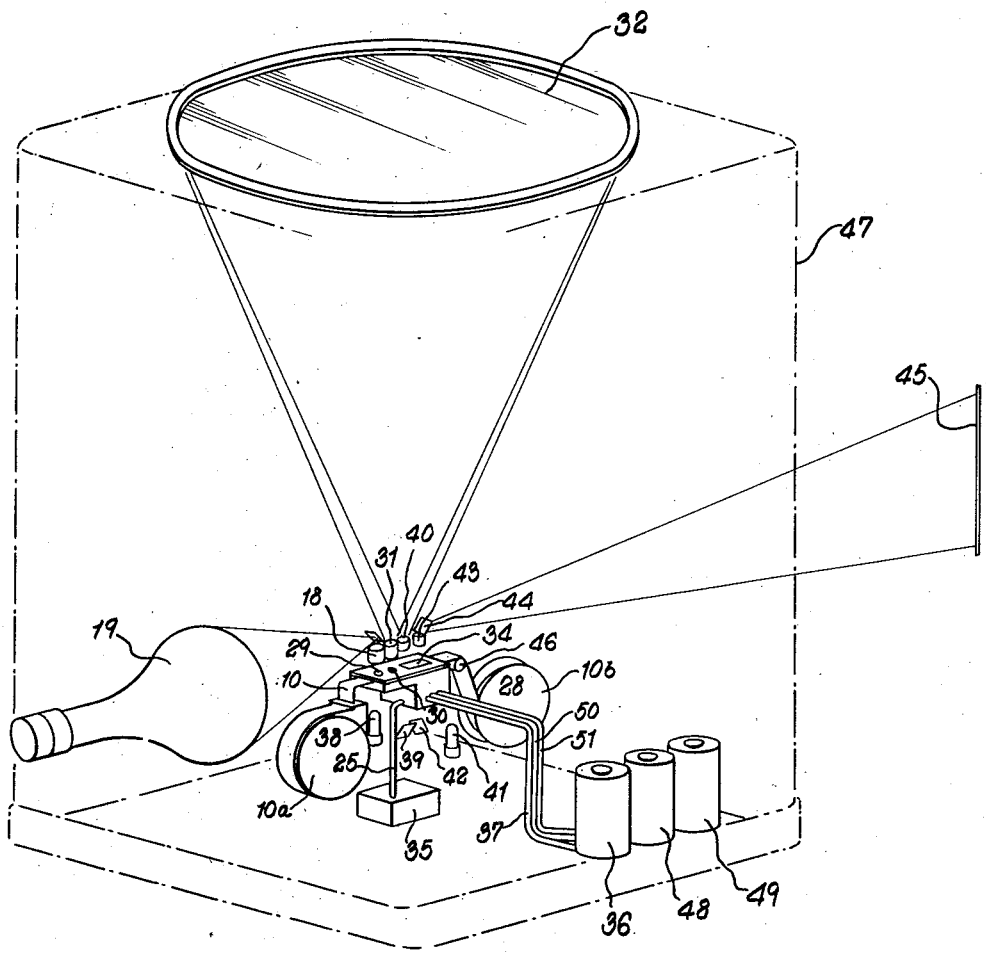
Fig. 4 is a perspective view of a modified form of the system.

Unexposed film 10 in strip form is fed from a supply roll 10a over a sprocket 11 to an exposure station 12, thence between two transparent members 13 and 14 forming between them an exposure station 15, thence over an intermittently driven sprocket 16, and finally to a take-up roll 10b. The sprocket 16 is driven from a suitable power source 17, which may include a Geneva mechanism, or the like, to provide the intermittent rotation of the sprocket.

Adjacent the exposure station 12 is an objective lens 18 interposed between this station and the object 19 to be photographed, such as a radar screen. Thus, an image of the radar screen is formed by the lens 18 on the emulsion side of the film at the exposure station 12.

The transparent members 13 and 14, which form the processing station 15, may be made of fused quartz. As shown particularly in Fig. 3, the member 13 is formed with a shallow recess 13a at the emulsion side of the adjacent film 10. This recess is normally covered by the film and corresponds in area to the exposed portion of the film. A feed passage 13b in the member 13 leads into the recess 13a along one edge thereof and is connected to a pipe 21 having branch pipes 22, 23, and 24. The branch pipes being provided with valves 22a, 23a, and 24a, respectively. The branch pipes 22, 23, and 24 are connected, respectively, to reservoirs (not shown) for a developer solution, a fixing solution, and a washing solution. An outlet passage 13c communicates with the recess 13a along the edge thereof opposite the inlet passage 13b. This outlet passage is connected to a suction pipe 25 leading to a suitable source of vacuum (not shown). By reason of the suction in the pipe 25, the developer solution from the supply pipe 22 is drawn into the recess 13a by way of pipe 21 and feed passage 13b, and then flows rapidly in a thin stream over the emulsion side of the adjacent film 10, the solution being discharged from the recess through passage 13c into the suction pipe 25. In this way, the latent image on the film is developed extremely rapidly. The suction in pipe 25 also acts to draw the film 10 against the adjacent face of the member 13 around the edges of recess 13a, thereby preventing leakage of the developer solution from the recess.

The other transparent member or platen 14 is likewise recessed, as shown at 14a, this recess being located opposite the recess 13a. A passage 14b in the member 14 leads to an opening 14c in the bottom of recess 14a. The passage 14b is connected to a suction pipe 26. Due to the partial vacuum maintained in recess 14a by the suction tube, the tendency for the film 10 to be drawn into the processing recess 13a, under the action of the suction in pipe 25, is counteracted. Therefore, the film will remain substantially flat between the members 13 and 14 during the processing operation. If desired, a porous transparent insert may be arranged in the recess 14a of the platen 14 with the outer face of the insert flush with the platen face adjacent the film. In this way, a higher vacuum may be maintained by pipe 26 in the recess 14a than is maintained in the opposing recess 13a, and the film will be held flat against the surface of the porous insert. Such an arrangement is disclosed in a copending application of Ernest Maiwald, Serial No. 175,715, filed July 25, 1950.

A lamp 28 is positioned at one side of the processing station 15. Light from the lamp 28 is condensed by a lens 29 adjacent the transparent member 14, so that the condensed light passes through the member 14, the film at the processing station, and the transparent member 13. An actinic light filter 30 is interposed between the light source and the processing station, so that the light passing through the film at this station is rendered non-actinic. At the opposite side of the processing station is a projection lens 31 which receives the light passing through the members 13 and 14. From the lens 31, the light passes through a prism 32 and is brought to a focus on a projection screen 33.

In the operation of the system, each film frame is exposed at the station 12 as soon as it is moved to this station from the supply roll 10a by the film actuator 17. In the next operation of the intermittently driven sprocket 16, the exposed film frame is moved to the processing or developing station between the transparent members 13 and 14. At the instant when the exposed film frame is drawn into the processing station 15, uniform minus blue light is projected onto the screen 33 from lamp 28 by way of the optical elements including the filter 30, the lens 29, transparent members 13 and 14, lens 31 and prism 32, this projected light, of course, passing through the film 10 at the processing station. The developer solution valve 22a is opened in any suitable manner simultaneously with completion of the movement of the film frame to the processing station, with the result that fresh solution is immediately drawn over the emulsion side of the film by the suction pipe 25. Consequently, the latent image will begin to appear at once as a silver image on the screen 33. Within approximately the first half second, the development is complete. Therefore, the image appears on the screen 33 almost immediately, and it increases in contrast and legibility for the first half second. Thus, during the short interval of the development operation, the image is available for inspection on the screen 33. Thereafter, if desired, the valve 22a may be closed and the valve 23a opened to feed the fixing solution through the recess 13a, whereby complete fixing of the image with some slight additional increase in contrast occurs in the next half second. The valve 23a may then be closed and the valve 24a opened to feed the washing solution through recess 13a, although the washing of the film is unimportant unless it is desired to keep the film record permanently. During the processing of the film at the station 15, and while the image is being inspected on the screen 33, the next film frame at the station 12 is being exposed to form another latent image of the object 19. When this exposure is completed, the sprocket 16 is again rotated to remove the developed film from the processing station 15, advance the exposed film from station 12 to station 15, and move the next film frame to the exposure station 12.

It will be apparent that the valve 22a constitutes a means for operating the developer feeding means (22, 21, 13a, 25) simultaneously with the operation of the lamp 28.

The exposure station 12 and the processing station 15, and the film leading thereto, may be arranged in any suitable light-tight casing. The emulsion on the film 10 is preferably of the type composed of exceedingly small silver halide particles embedded in a thin gelatine layer. The fine particle size renders the film transparent and nonscattering to the non-actinic light from lamp 28.

Referring to Fig. 4, the film 10 passes from the supply roll 10a to a housing 28 having an aperture forming a first exposure station 29. The objective lens 18 focuses an image of the radar screen or tube 19 on the film at station 29. Beyond the station 29, the housing has an aperture forming a second exposure station 30 underlying an objective lens 31, which focuses on the film at station 30 an image of a plotting screen 32. Thus, adjacent frames of the film 10 at stations 29 and 30 are exposed simultaneously to form images of the radar screen 19 and the plotting screen 32, respectively. Beyond the station 30, the housing has a double station 34 where the latent images formed on the film at the two exposure stations are simultaneously developed and projected. In other words, each of the two sections of the double station 34 corresponds to the processing and projection station 15 of Fig. 1, in that it allows projection of light through the adjacent transparent film during rapid flow of a developer solution in a thin stream across the emulsion side of the film (the lower side as here shown). It will be understood that within the housing 28, and directly below the film at station 34, is a transparent recessed member similar to the member 13, except that its shallow recess has an area corresponding to two adjacent frames of the film. Suction is applied to this recess from a vacuum source 35 (also a waste tank) through a suction pipe 25, to draw the developer solution through the recess from tank 36 and supply pipe 37 leading into the housing and the recessed member. Thus, the solution will flow along the emulsion side of both film frames at station 34, so that the images thereon will be developed simultaneously, the spent solution being discharged through suction pipe 25 into the vacuum waste tank 35.

Since the transparent recessed member in the housing 28 is of the same nature and performs the same functions as the member 13, it is unnecessary to describe and illustrate it. While the housing 28 as shown is not arranged to accommodate an opposing transparent member similar to the platen 14 of Fig. 1, such a platen may, if desired, be positioned directly above the film at station 34, so as to prevent even a slight drawing of the film into the shallow recess for the processing solution.

Light from a lamp 38 is projected upward by a reflector 39 through the housing 28, including the transparent recessed member, and the lagging frame of the film at station 34, the light then passing through a projection lens 40 to the plotted screen 32. Light from another lamp 41 is projected upward through the housing, the transparent recessed member and the leading frame of the film at station 34, this light then passing through a projection lens 43 to a reflector 44, which directs the beam laterally upon a projection screen 45. An actinic light filter and a condensing lens are located in the housing in the path of each light beam from the lamps 39 and 41, so that the condensed light passing through each film frame at station 34 is rendered non-actinic.

In operation, the film 10 is advanced intermittently by a suitable actuator, such as the intermittently driven sprocket 46, through a distance corresponding to the spacing between alternate frames on the film. Thus, the leading and lagging frames arriving at the double station 34, at each advance of the film, will have been previously exposed at the stations 30 and 29, respectively, and will therefore have latent images of the plotting screen 32 and the radar screen 19, respectively. As soon as these frames come to rest at the station 34, the developer solution is drawn through the housing 28 and the recess of its transparent member corresponding to member 13, as by opening a suitable valve (not shown) in the supply pipe 37. Immediately, the image of the radar screen 19 will begin to appear on the plotting screen 32, where the desired indicia are plotted or traced from the image in the usual manner, and at the same time an image of the indicia previously plotted on the screen 32 will begin to appear on the projection screen 45. These images will increase in contrast and legibility for the first half second, when the development is completed. At the same time, the new film frames at the stations 29 and 30 are being exposed to form new images of the radar screen 19 and plotting screen 32, respectively. Upon the next advance of the film, this procedure is repeated so that the new image of the radar screen and the image of the previous plot on the screen 32 appear on the screen 32 and the projection screen 45, respectively. In this way, the system provides means for readily comparing and analyzing successive images of the radar screen 19.

The apparatus of Fig. 4 may be mounted in a light-tight casing 47 carrying the plotting screen 32 and having an aperture through which the images of screen 32 are projected upon the screen 45. If desired, additional tanks 48 and 49 may be connected through valved pipe lines 50 and 51 to the housing 28 to supply fixer and washing solutions to the film at station 34.

I claim:

1. In a photographic system for rapidly presenting and comparing data from an object, the combination of first and second viewing screens, a pair of film exposure stations and a pair of film developing stations, a lens for projecting an image of said object on a film at one of the exposure stations, a lens for projecting an image of the first screen on a film at the second exposure station, means for feeding a developer solution to film at said developing stations to develop simultaneously the images on the film at said last stations, means operable simultaneously with said feeding means for projecting light through the film at one of the developing stations and upon said one screen, means operable simultaneously with said feeding means for projecting light through the film at the second developing station and upon the second screen, and an intermittently operating actuator for simultaneously moving film from said first and second exposure stations to said first and second developing stations, respectively.

2. A system according to claim 1, in which said first screen is a plotting screen.

3. A system for rapidly presenting a photographic image of an object, which comprises an exposure station for receiving a photographic film, a lens positioned to project an image of said object on the film at said station, a transparent member forming a film developing station for receiving the film from the exposure station, said member having a recess adapted to be covered by the emulsion side of the film at the developing station, means for feeding a developer solution through said recess to develop the latent image on the film, a viewing screen, a light source, optical elements including said member arranged to project light from said source through the film at the developing station and upon the screen, means for operating said feeding means simultaneously with the operation of said light source whereby the image appears on the screen with increasing clarity as it develops on the film, and a film actuator for moving the film from the exposure station to the developing station, said feeding means including a suction tube communicating with said recess for drawing the developer solution therethrough, a transparent platen member having a recessed portion opposite said recess, said members forming between them the developing station, and a suction tube communicating with said recessed portion of the platen member for creating a partial vacuum therein to counteract the tendency for the film to be drawn into said recess for the developer fluid, whereby the film is held substantially flat between said members.

4. A system for rapidly presenting a photographic image of an object, which comprises an exposure station for receiving a photographic film, a lens positioned to project an image of said object on the film at said station, a transparent member forming a film developing station for receiving the film from the exposure station, said member having a recess adapted to be covered by the emulsion side of the film at the developing station, means for feeding a developer solution through said recess to develop the latent image on the film, a viewing screen, a light source, optical elements including said member arranged to project light from said source through the film at the developing station and upon the screen, means for operating said feeding means simultaneously with the operation of said light source whereby the image appears on the screen with increasing clarity as it develops on the film, a film actuator for moving the film from the exposure station to the developing station, a second exposure station disposed along the path of movement of the film by the actuator, a lens positioned to project an image of said screen on the film at the second exposure station, said developing station being a double station adapted to receive simultaneously the film portions from the two exposure stations, whereby the images on said film portions are developed simultaneously by the solution delivered to the film by said feeding means, a second screen, and means for projecting light through the film at said developing station and upon the second screen, said film actuator being operable to move the film portion from said first exposure station into the path of the light projected through the developing station from said source to the first screen and simultaneously to move the film portion from said second exposure station into the path of the light projected through the developing station upon the second screen by said projecting means.

5. A system according to claim 4, in which said first screen is a plotting screen.

References Cited in the file of this patent

UNITED STATES PATENTS

| Number | Name | Date |
|---|---|---|
| 1,222,654 | Mischansky | Apr. 17, 1917 |
| 1,487,729 | Ybarrondo | Mar. 25, 1924 |
| 1,959,233 | Franke | May 15, 1934 |
| 2,186,637 | Green | Jan. 9, 1940 |
| 2,221,055 | Lundegardh | Nov. 12, 1940 |
| 2,294,423 | Del Riccio | Sept. 1, 1942 |
| 2,446,668 | Tuttle | Aug. 10, 1948 |
| 2,473,174 | Pifer | June 14, 1949 |
| 2,586,772 | Ashby | Feb. 26, 1952 |